Oct. 6, 1925.
H. E. TOMLINSON ET AL
1,556,180
VEHICLE AXLE
Filed May 29, 1922  3 Sheets-Sheet 1
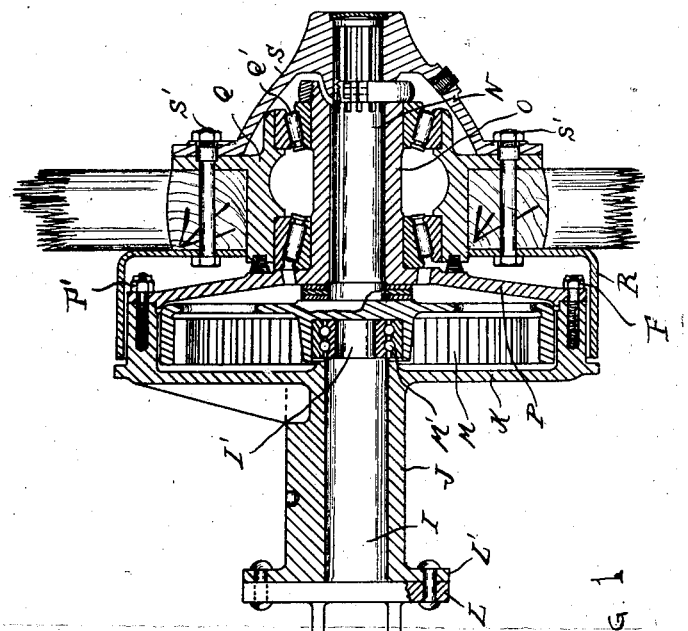
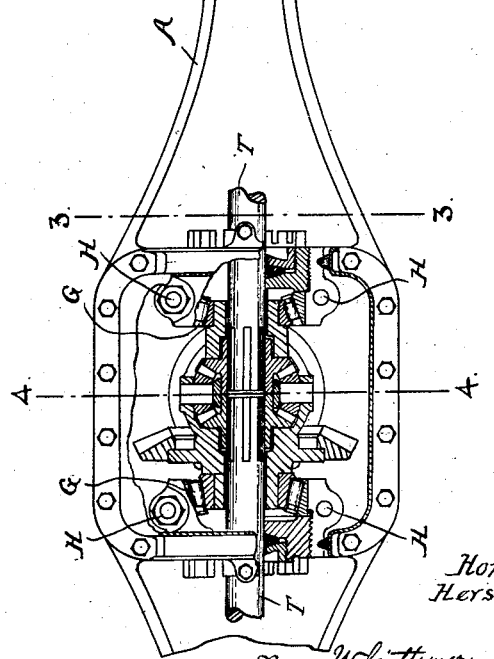
Inventors
Homer E. Tomlinson
Herschel P. Kinsolving
By Whittemore Hulbert Whittemore
 & Belknap  Attorneys Oct. 6, 1925.  
H. E. TOMLINSON ET AL  
1,556,180  
VEHICLE AXLE  
Filed May 29, 1922  
3 Sheets-Sheet 3

Inventors  
Homer E. Tomlinson  
Herschel P. Kinsolving  
By Whittemore Hulbert Whittemore  
& Belknap  
Attorneys.

Patented Oct. 6, 1925.

1,556,180

UNITED STATES PATENT OFFICE.

HOMER E. TOMLINSON, OF MALDEN, MISSOURI, AND HERSCHEL P. KINSOLVING, OF KOKOMO, INDIANA.

VEHICLE AXLE.

Application filed May 29, 1922. Serial No. 564,401.

*To all whom it may concern:*

Be it known that we, HOMER E. TOMLINSON, a citizen of the United States of America, residing at Malden, in the county of Dunklin, in the State of Missouri, and HERSCHEL P. KINSOLVING, a citizen of the United States of America, residing at Kokomo, in the county of Howard and State of Indiana, have invented certain new and useful Improvements in Vehicle Axles, of which the following is a specification, reference being had therein to the accompanying drawings.

The invention relates to vehicle axles particularly designed for use on trucks and other heavy constructions, and it is the object of the invention to obtain; first, a structure combining strength and relatively large road clearance; second, the effective housing of the gearing so as to retain the lubricant and exclude dirt; and third, various specific advantages referred to hereinafter. With these objects in view the invention consists in the construction as hereinafter set forth.

In the drawings:

Figure 1 is a sectional elevation of the axle;

Figure 2:
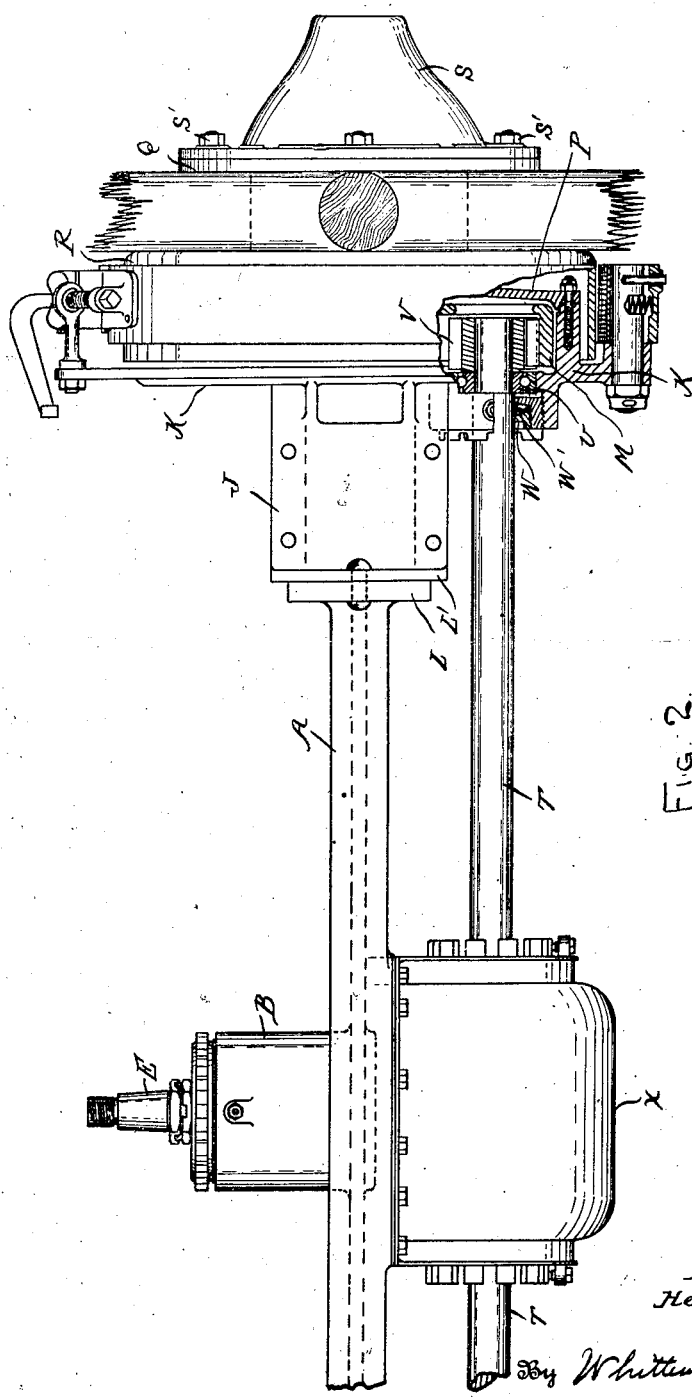
Figure 2 is a sectional plan view thereof.
Figure 4:
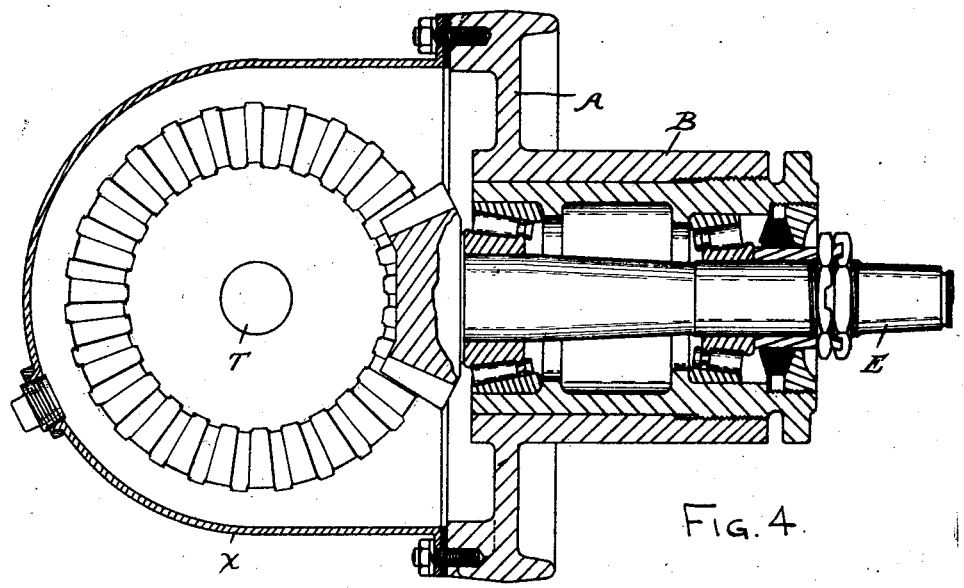
Figure 4 is a cross-section on line 4—4 of Figure 1.
Figure 3:
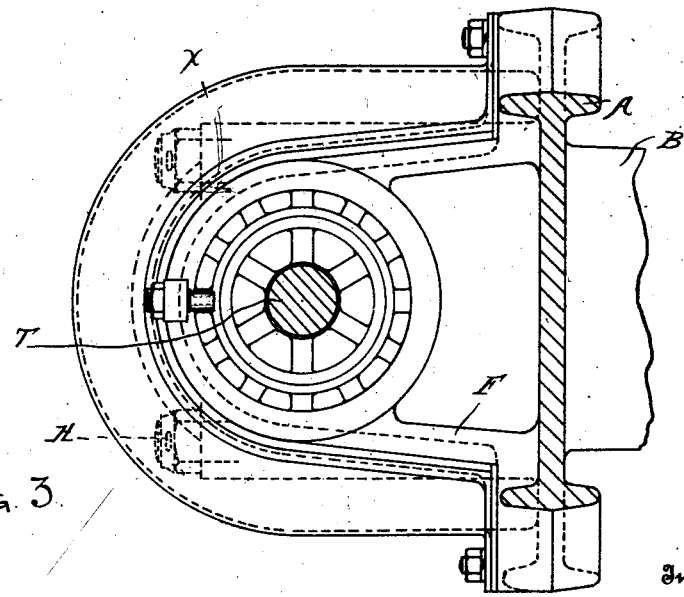
Figure 3 is a cross-section on line 3—3 of Figure 1.

The axle frame A is preferably formed of cast steel and is preferably of an I-beam cross-section with its web diminishing in depth from the center towards the opposite ends. At the center and projecting forward from the web is the housing B, preferably integral with the frame which receives the bearings for the propeller drive shaft E. On the opposite side of the web are the integral brackets F for receiving the bearings G for the differential gearing. The brackets F are provided with complementary caps secured thereto by studs H. Thus the differential gearing is supported on one side of the frame and the drive shaft on the opposite side, the latter extending through the central aperture in the web into operative relation to the gearing.

Projecting axially from the opposite ends of the frame A are the stub shafts I on which are pressed the hubs J of housing K for the step-down gearing. The frame A is provided with a flange L adjacent to the stub shaft I and the hub J with the corresponding flange L', these two flanges being riveted or otherwise secured to each other. Within the housing K is the internal gear wheel M, which is journaled on a ball or other anti-friction bearing M' on a reduced end portion I' of the stub shaft I. The gear wheel M is provided with an outwardly projecting stub shaft N which passes through a sleeve or hub O on a cap member P for the housing K. The latter is attached by bolts or studs P' to a peripheral flange of said housing and forms an oil tight joint therewith. Surrounding the sleeve or hub O is the wheel hub Q which is journaled thereon by means of anti-friction bearings Q'. A brake drum R is secured to this hub so as to surround the casing K, but to be free therefrom. S is a hub cap which is centrally connected to the shaft N by a splined engagement therewith and is peripherally secured to the wheel hub by the bolts S', thereby transmitting the torque from the shaft N to the wheel.

The driven shafts T of the differential gearing extend laterally therefrom to the housings K, each passing through a bearing U therein and having mounted on its outer end the pinion V for engagement with the internal gear wheel M. The opening in the housing through which the shaft passes is closed by a screw cap W having a felt ring W' or other means for forming an oil seal. The differential gearing is housed by a casing X, preferably of sheet metal, which is secured to the member A and forms an oil tight and dust tight joint therewith.

With the construction described the load of the vehicle is carried by spring seats formed at the top of the member J. The braking torque is carried into the housings and through the hub J and flanges L and L' into the frame member of the axle which may be provided with a torque rod or other suitable means (not shown) for taking care of this stress. The driving reaction is carried directly into the frame A, which, on account of its structural form, combines great strength with light weight.

It will be noted that the structure described constitutes a full floating axle, in which the load is transmitted directly from the sleeve or hub O to the wheel hub and the torque only is transmitted through the stub axle N and cap S.

What we claim as our invention is:

1. The combination of a dead axle in the form of a structural beam, a housing secured to the end of said dead axle, a gear journaled in axial alignment with said dead axle located within said housing, a stub shaft secured to said gear and extending outward therefrom in axial alignment with said dead axle, a live axle extending parallel to said dead axle and offset with respect to the axis of said housing, a gear on said live axle meshing with said first mentioned gear, a cover for said housing having a hollow hub through which said stub shaft passes, a wheel hub journaled upon said hollow hub, and a torque connection between said stub shaft and wheel hub.

2. The combination of a dead axle in the form of a structural beam having its greatest width at the center and tapering towards opposite ends, a stub shaft projecting from the end of said axle, a housing having a hub mounted upon said stub shaft, a cap for said housing having a hollow outwardly projecting hub, a wheel hub journaled upon said hollow hub, an internal gear wheel within said housing provided with a stub shaft projecting outward through said hollow hub, a live axle extending parallel to said dead axle and offset with respect to the axis of said housing, a gear on said live axle meshing with said internal gear, and a torque connection between the outer end of said stub shaft and said wheel hub.

3. A dead axle in the form of a structural beam having a central vertical web and top and bottom flanges, said beam diminishing in width from the center towards its ends, a stub axle integral with said beam projecting from the end thereof, a gear housing having a hub sleeved upon said stub axle, adjacent flanges upon said beam and gear housing hub connected to each other to transmit torque stresses, a cap for said gear housing having a hollow outwardly projecting hub, a wheel hub journaled upon said hollow hub, an internal gear wheel within said housing, a stub axle upon said gear wheel projecting outward from said hollow hub, and a cap secured to said stub axle and transmitting the torque stresses therefrom to said wheel hub.

4. The combination of a dead axle in the form of a structural beam having a centrally vertically extending web and flanges at the top and bottom thereof, said beam tapering from the center towards its opposite end, integral brackets projecting laterally from said web on one side thereof for supporting the differential gearing, a housing integral with and projecting from the opposite side of said web for receiving the drive shaft, and a detachable casing for enclosing said differential gearing.

5. The combination of a dead axle in the form of a structural beam, a housing secured thereto having a hollow hub, a wheel hub journaled on said hollow hub, a stub shaft within said hollow hub and connected to said wheel hub, an internal gear journaled in said housing and secured to said stub shaft, a live axle offset from said dead axle and axis of said hollow hub and a gear mounted on said live axle and meshing with said internal gear.

6. The combination of a dead axle in the form of a structural beam, a housing for the drive shaft projecting from one side of said dead axle, a mounting for the differential gear, projecting from the opposite side of said dead axle, said axle being centrally apertured for the operative connection of said drive shaft to said differential gearing, a housing for said differential gearing, a housing mounted at the outer end of said dead axle, a cover for said housing having a hollow outwardly projecting hub, a wheel hub journaled upon said hollow hub, an internal gear wheel within said housing provided with a stub shaft projecting outward through said hollow hub, a torque connection between said stub shaft and said wheel hub and a driven shaft extending from said differential gearing housing to the housing at the outer end of said dead axle into operative relation to said internal gear, said driven shaft being parallel to said dead axle and the axis of said hollow hub.

7. The combination of a dead axle in the form of a structural beam having a central vertically extending web provided with an aperture, said beam tapering from the center towards its opposite ends and having flanges at the top and bottom thereof, integral brackets projecting laterally from said web on one side thereof, an integral housing projecting from the opposite side of said web, a differential gear having bearings directly mounted in said integral brackets, a casing for enclosing said differential gear detachably mounted on said dead axle independent of said differential gear, and a pinion shaft mounted in said integral housing and extending through said aperture into engagement with said differential gear.

In testimony whereof we affix our signatures.

HOMER E. TOMLINSON.
HERSCHEL P. KINSOLVING.